(12) United States Patent
Chani et al.

(10) Patent No.: US 11,598,666 B1
(45) Date of Patent: Mar. 7, 2023

(54) ORANGE DYE-JELLY COMPOSITE-BASED FLEXIBLE ELECTROCHEMICAL CELLS FOR INFRARED AND ULTRA VIOLET IRRADIATION SENSING

(71) Applicant: King Abdulaziz University, Jeddah (SA)

(72) Inventors: Muhammad Tariq Saeed Chani, Jeddah (SA); Abdulla M Asiri, Jeddah (SA); Khasan S Karimov, Jeddah (SA); Tahseen Kamal, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/676,561

(22) Filed: Feb. 21, 2022

(51) Int. Cl.
  *G01J 1/48* (2006.01)
  *G01J 1/02* (2006.01)
(52) U.S. Cl.
  CPC .. *G01J 1/48* (2013.01); *G01J 1/02* (2013.01)
(58) Field of Classification Search
  CPC ...................................... G01J 1/48; G01J 1/02
  See application file for complete search history.

(56) References Cited

U.S. PATENT DOCUMENTS

| | | | | |
|---|---|---|---|---|
| 11,174,407 B2* | 11/2021 | Gooding | .............. | C09D 11/322 |
| 2004/0167461 A1 | 8/2004 | Nitzan | | |
| 2004/0267189 A1 | 12/2004 | Mavor | | |
| 2006/0219989 A1 | 10/2006 | Yoon | | |
| 2009/0323014 A1 | 12/2009 | Cunningham | | |
| 2013/0089769 A1 | 4/2013 | Proctor | | |
| 2015/0102208 A1 | 4/2015 | Appelboom | | |
| 2019/0237803 A1 | 8/2019 | Gerasopoulos | | |
| 2020/0149960 A1* | 5/2020 | Foller | ....................... | G01J 3/50 |
| 2020/0287240 A1 | 9/2020 | Hudak | | |
| 2020/0411906 A1 | 12/2020 | Gerasopoulos | | |

OTHER PUBLICATIONS

Karimov et al., Sensitivity enhancement of OD- and OD-CNT-based humidity sensors by high gravity thin film deposition technique, Mar. 2015, Journal of Semiconductors, Vo. 36, No. 3, pp. 1-4 (Year: 2015).*

Chiou et al., Additive-free carbon nanotube dispersions, pastes, gels, and doughs in cresols, May 2018, Proceedings of the National Academy of Sciences, Vo. 115, No. 22, pp. 5703-5708 (Year: 2018).*

Fatima et al., Effects of Humidity and Temperature on Orange Dye-Based Organic Field Effect Transistors Fabricated at Different Gravity, Jul. 2017, Journal of Electronic Materials, vol. 46, Iss. 11, pp. 6588-6594 (Year: 2017).*

Chani et al., Electrical properties of flexible rubber-based CNT/CNT-OD/Al cells fabricated by rubbing-in technology, Mar. 2021, Applied Physics A, vol. 127, Iss. 4, pp. 1-8 (Year: 2021).*

(Continued)

*Primary Examiner* — David P Porta
*Assistant Examiner* — Jeremy S Valentiner
(74) *Attorney, Agent, or Firm* — WCF IP

(57) ABSTRACT

Flexible and shockproof electrochemical cells for simultaneously detecting infrared and ultraviolet irradiation are provided. The electrochemical sensors comprise a flexible electrolyte comprising an orange dye suspended in a gel.

8 Claims, 7 Drawing Sheets

(56) References Cited

OTHER PUBLICATIONS

Asghar et al., Multifunctional organic shockproof flexible sensors based on a composite of nickel phthalocyanine colourant, carbon nanotubes and rubber creating with rubbing-in technology, Sep. 2021, Coloration Technology, vol. 138, Iss. 2, pp. 176-183 (Year: 2021).*

Shafique et al., Carbon nanotubes, orange dye, and graphene powder based multifunctional temperature, pressure, and displacement sensor, May 2020, Journal of Materials Science, vol. 31, Iss. 11, pp. 8893-8899 (Year: 2020).*

Karimov "Fabrication of flexible conductive films by rubbing in technology for application in elastic thermo-electric cells" 2019.

Pawlicka "Bio-inspired materials for electrochemical devices" 2015.

Shang, "An Overview of Fleible Electrode Materials/Substrates for Flexible Electrochemical Energy Storage/Conversion Devices" 2021.

* cited by examiner

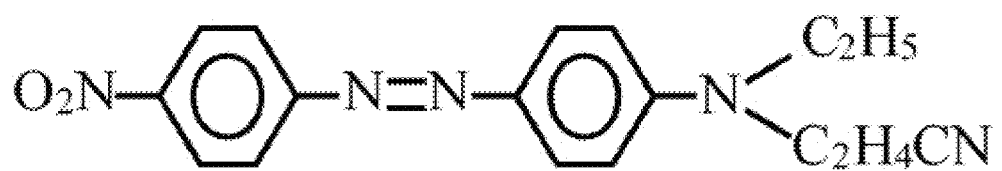
Figure 1
Figure 2A
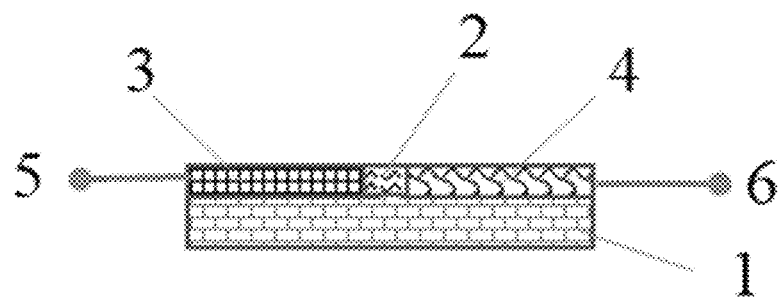
Figure 2B
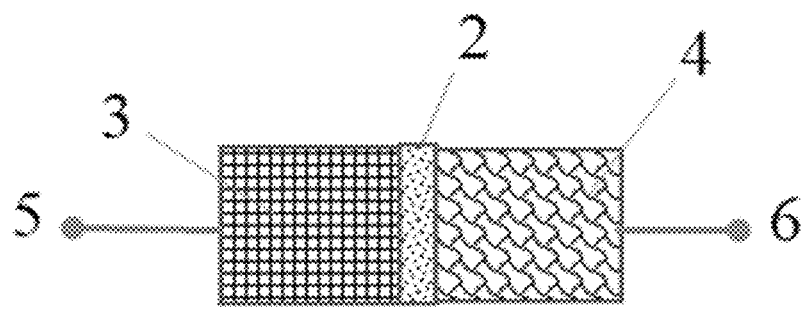

ORANGE DYE-JELLY COMPOSITE-BASED FLEXIBLE ELECTROCHEMICAL CELLS FOR INFRARED AND ULTRA VIOLET IRRADIATION SENSING

BACKGROUND OF THE INVENTION

Field of the Invention

The invention generally relates to flexible and shockproof electrochemical cells for detecting infrared and ultraviolet irradiation. In particular, the electrochemical cell comprises a flexible electrolyte comprising an orange dye suspended in a gel.

Description of Related Art

Electrochemical, infrared and ultraviolet sensors are used in many different areas of modern technologies. At the same time, the combinations of these sensors may be considered as a new stream in the sensor and electrochemical devices technologies at the present time. Electrochemical sensors based on organic conjugated polymers are discussed in ref. [1]. Films of nanocrystalline metal oxide containing adsorbed perylenediimide derivatives (polyether) have been studied for electrochemical and optical properties [2]. In ref. [3] graphene based electrochemical sensors and biosensors were reviewed. All-organic semiconductors for electrochemical biosensors were discussed and an overview of recent progress in materials design were presented in ref. [4]. Recently, papers based electronics were introduced as well: electrochemical sensors using paper as a scaffold to create porous carbon nanotube electrodes was published [5]. Newly designed, fabricated and investigated infrared detectors were discussed in ref. [6]. A semiconductor film bolometer thermal infrared detector was patented as well [7]. Infrared systems and devices [8] and detection of chemicals with infrared light [9] were described in certain patents. Graphene based wearable infrared photodetectors and temperature sensors fabricated on polyimide flexible substrates were presented in ref. [10]. Organic photodiodes and phototransistors were fabricated and investigated for infrared detection [11]. In ref. [12] ultraviolet light sensors based on facile constructive heterojunction of ZnO nanorod/PEDOT: PSS were fabricated and discussed with their mechanism and efficient performance.

Due to demands of the developing technologies and industries, much attention has been paid to the fabrication and investigation of ultraviolet sensors, along with infrared detectors. Blends of naphthalenediinaide and polyfluorene have been used to fabricate highly proficient UV photodetectors and the effect of thermal annealing on their performance was studied in detail [13].

The effect of ultraviolet radiation on organic photovoltaic materials and devices was described in ref. [14]. Ferroelectric infrared sensors and methods for their manufacturing were presented in ref. [15]. For proficient ultraviolet photodetection, an organic semiconductor/silicon (hybrid) photodiode was presented in ref. [16]. In ref. [17] a display with an infrared back light source and multi-touch sensing function was described. Wide band gap semiconductor nanowires based solid state UV detectors were reviewed in ref. [18].

The detection of infrared and ultraviolet radiation and related device manufacturing techniques were described in ref. [19]. The properties of bolometres having an organic semiconductor layer arrangement were presented in ref. [20].

In ref. [21] infrared sensor arrays and photodiodes with enhanced passivation layers and manufacture methods were described. In ref. [22] diode bolometer and methods for producing a diode bolometer were described.

The cited references show that for fabrication of organic materials-based infrared sensors, mostly polymers, graphene and carbon nanotubes have been used by utilization of well-known traditional technologies. At the same time, in some particular cases, for example, for ultraviolet sensors, not only organic polymers but also inorganic materials were used as well, for example, ZnO.

An analysis of published papers and patents showed that in these publications, information about compostions, structure and properties of the IR and UV sensors fabricated up to present time on the basis of organic and inorganic materials. However, much less information about organic semiconductor-based devices that are combined infrared (IR) and ultraviolet (UV) sensors is available. This approach (detection of both IR and UV in a single sensor) would allow users to widen application areas, decrease the total cost of the devices and decrease negative experimental effects during fabrication of the devices.

SUMMARY OF THE INVENTION

A flexible and shockproof electrochemical cell for the detection of both IR and UV irradiation is provided. The electrochemical cell comprises a flexible electrolyte comprising an orange dye (OD) suspended in a gel. Fabrication of the sensors is simple and does not require complicated and expensive equipment, thereby permitting fabrication of the devices not only for the research purposes, but also for teaching purposes in educational laboratories.

Advantages of the disclosed electrochemical cells include but are not limited to:
Design and fabrication of the Al/OD-Jelly/Cu rubber composite shockproof flexible electrochemical cells are very simple
Materials used for the fabrication of the cells are easily available, low cost and environmentally friendly;
Cell's active film was deposited by "rubbing-in" technology, which is simple and reliable and is also novel;
The Al/OD-Jelly/Cu rubber composite electrochemical cell fabrication and utilization can be used as prototype for the development of jelly electronic based devices which are advantageously shockproof and shake-proof;
The fabricated cells exhibited stable performance under vibration using a laboratory vibrator.

It is an object of this invention to provide a flexible electrolyte comprising an orange dye suspended in a gel. In some aspects, the orange dye is 3[N-Ethyl-4-(4-nitrophenylazo)phenylamino]propionitrile. In further aspects, the gel is a flexible, transparent adhesive gel. In additional aspects, the gel comprises gelatin, xanthan gum, polyvinyl pyrrolidone (PVP), cross-linked poly (sodium acrylate) or pectin.

The invention also provides a flexible infrared and ultraviolet radiation sensor, comprising a first electrode and a second electrode positioned on a first section and a second section, respectively, of a top surface of a porous, elastic substrate; and the flexible electrolyte of claim 1 positioned on the top surface of the porous, elastic substrate and between the first electrode and the second electrode. In some aspects, the porous, elastic substrate is selected from the group consisting of: paper, porous polyethylene terephthalate (PET), porous polystyrene-block-poly(ethylene-ran-butylene)-block-polystyrene and rubber. In additional aspects, the first electrode and the second electrode are made of aluminum, copper, gold, silver, platinum, nickel or zinc.

The invention also provides a method of making a flexible infrared and ultraviolet radiation sensor, comprising positioning a first electrode and a second electrode on a first section and a second section, respectively, of a top surface of a porous, elastic substrate; and positioning a flexible electrolyte on the top surface of the porous, elastic substrate and between the first electrode and the second electrode, wherein the flexible electrolyte comprises an orange dye suspended in a gel.

Also provided is a method of simultaneously detecting UV and IR irradiation, comprising exposing the flexible IR and UV radiation sensor of claim 5 to a potential source of UV and/or IR irradiation, and detecting a voltage change in the flexible IR and UV radiation sensor, wherein the voltage change indicates that the source is emitting one or both of UV and IR irradiation.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

FIG. 1. Molecular structure of an exemplary orange dye (OD) 3-[N-Ethyl-4-(4-nitrophenylazo)phenylamino]propionitrile.

FIG. 2A-B. Schematic of the front view (a) and the top view (b) of an exemplary rubber based Al/OD-Jelly/Cu composite flexible electrochemical cell: rubber substrate (1), OD-jelly composite (2), Al electrode (3), Cu electrode (4), metallic terminals (5 and 6).

DETAILED DESCRIPTION

Figure 3:
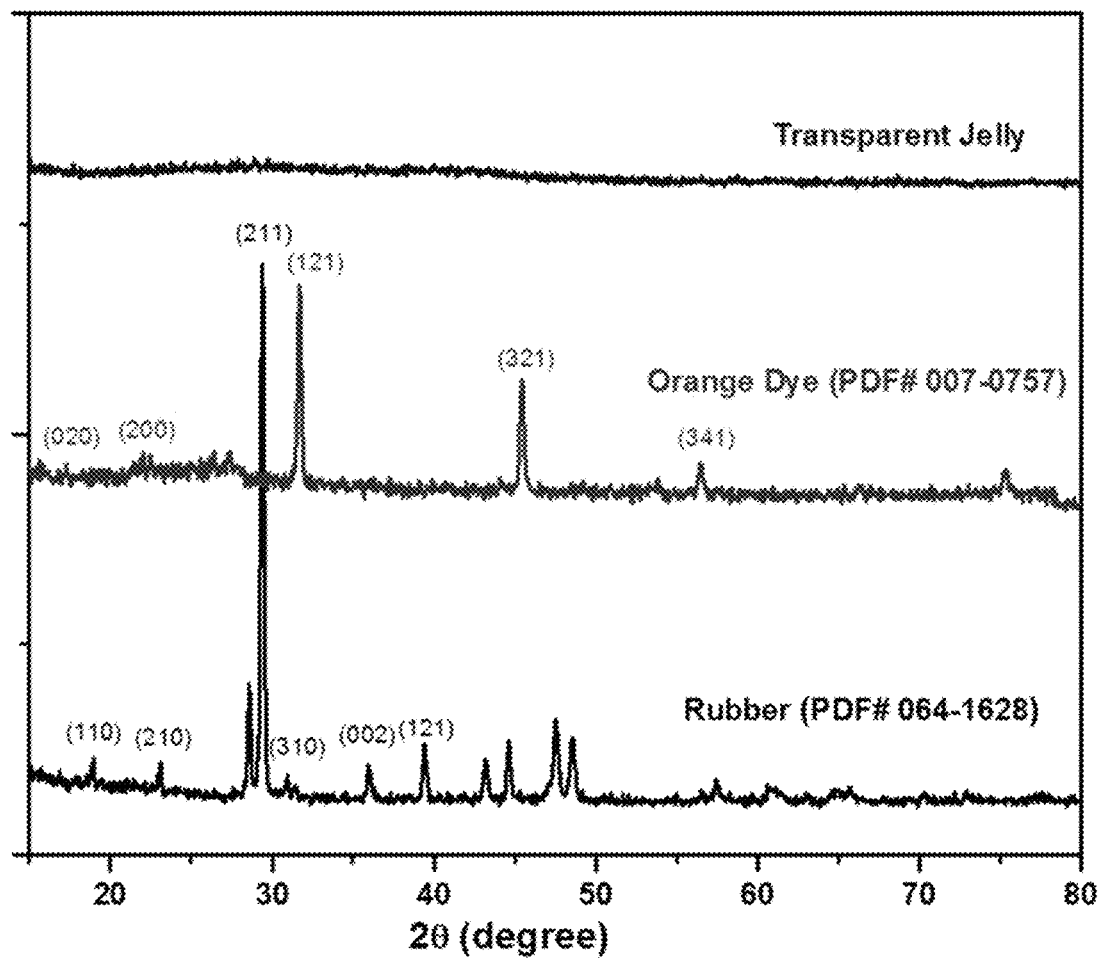
FIG. 3. XRD scans of the OD, transparent jelly and rubber substrate.

A flexible and shockproof electrochemical cell was designed, fabricated, and investigated for the detection of both IR and UV irradiations.

In an exemplary embodiment, the electrochemical cell was an Al/OD-Jelly/Cu made by depositing a transparent jelly-orange dye composite on a porous rubber substrate between aluminum and copper electrodes. In this aspect, the orange dye, $C_{17}H_{17}N_5O_2$, (IUPAC name 3-[N-Ethyl-4-(4-nitrophenylazo)phenylamino]propionitrile) was used. This dye is an organic semiconductor having p-type conduction. The jelly-orange dye composite was mechanically similar to jelly, i.e. soft and flexible. Electrically, the composite (jelly-orange dye) forms a flexible electrolyte. For this exemplary aspect, it was found that the impedance of the samples under infrared irradiation decreased by 2.02 to 2.19 times on changing the frequency from 100 Hz to 200 kHz. Under ultraviolet irradiation, the impedance of the samples decreased by 1.23 to 1.45 times upon increasing the frequency from 100 Hz to 200 kHz. Under infrared irradiation up to 4000 $W/m^2$, the cell's open-circuit voltage increased 1.59 times; and the cell's open-circuit voltage also increased 1.06 times under UV irradiation up to 200 $\mu W/cm^2$. The flexible rubber substrate-based Al/OD-Jelly/Cu electrochemical cells can also be used as prototype for the development of many jelly electronics-based devices.

Flexible Electrolyte

The flexible electrochemical cells disclosed herein comprise a flexible electrolyte comprising a gel layer which comprises a water-soluble orange dye.

Orange Dye

The orange dye is generally an organic semiconductor having p-type conduction. For use in manufacturing the electrochemical cells, the orange dye may be in powder form or in a concentrated liquid form, both of which are readily available from commercial vendors. After curing, the gel many be transparent and is generally adhesive to permit the attachment (or its attachment) to other cell components.

Examples of suitable dyes include but are not limited to: Disperse Orange 25 (3[N-Ethyl-4-(4-nitrophenylazo)phenylamino]propionitrile); Orange G, the disodium salt of 7-hydroxy-8-[(E)-phenyldiazenyl]naphthalene-1,3-disulfonic acid; Disperse Orange 3 (4-(4-Nitrophenylazo)aniline); methyl orange (sodium 4-{[4-(dimethylamino)phenyl]diazenyl}benzene-1-sulfonate); a styryl fluorophore dye such as SYPRO® Orange or SYPRO® Tangerine; etc. In some aspects, the orange dye is Disperse Orange 25 (3[N-Ethyl-4-(4-nitrophenylazo)phenylamino]propionitrile).

Gel (or "Jelly")

Examples of materials which can be used as or used to form the gel layer include but are not limited to: superabsorbent polymers, while the other gels such as gelatin-based jelly, Xanthan gum, polyvinyl pyrrolidone (PVP) or pectin may be used. Moreover, it is also important that the gel should be glue-like, i.e. adhesive or "sticky" so that it will adhere to the other components of the cell and vice versa, i.e. so that the other components will adhere to the gel.

By "superabsorbent polymer (SAP)" (also called slush powder) we mean a polymer that absorbs and retains large amounts of a liquid relative to its own mass. Water-absorbing polymers, which are classified as hydrogels when mixed, absorb aqueous solutions through hydrogen bonding with water molecules. Examples of suitable polymers that can be used to form the gel layer include but are not limited to: starch polymer with grafted acrylic acid, acrylamide and polyvinyl alcohol (PVA); polyacrylate/polyacrylamide; various polymers made from the polymerization of acrylic acid blended with sodium hydroxide (sodium polyacrylate); polyacrylamide copolymer, ethylene maleic anhydride copolymer, cross-linked carboxymethylcellulose, polyvinyl alcohol copolymers, cross-linked polyethylene oxide, starch grafted copolymer of polyacrylonitrile, or combinations of these, etc. In addition, synthetic superabsorbent polymers derived from renewable resources such as those described in US patent application 20210131086 may be used. Various superabsorbent polymers are also disclosed, for example, in US patent applications 20210070888 and 20210040271. The complete contents of each of these US patent applications are hereby incorporated by reference in entirety.

In some aspects, the gel is made of superabsorbent polymers such as cross-linked sodium polyacrylate, cross-linked sodium carboxymethyl cellulose, etc. This gel is inodorous, non-edible, and environmentally friendly, and can be of the type that is used for so-called "fairy crafts" for children and/or for water retention or decoration in indoor plantings. One suitable type of gel is commercially available with a trade name of "Rainbow Crystal Clay" (see the website located at miracle-chemical.com). This gel may be, for example, cross-linked poly (sodium acrylate). The addition of other materials such as carbon nanotubes or a conductive orange dye makes the gel conductive or semi-conductive.

The Substrate

To form the flexible IR and US radiation sensors disclosed herein, the flexible electrolyte described above is positioned on a porous, elastic substrate.

The material or substrate selected for the ultraviolet and infrared irradiation sensors is a porous, flexible, deformable, elastic material. Examples of suitable materials for the substrate include but are not limited to, for example: paper, porous polyethylene terephthalate (PET), porous polystyrene-block-poly(ethylene-ran-butylene)-block-polystyrene, rubber and various flexible foams that are known in the art. Certain organic materials may also be used, including, for example, polyethylene (PE), polypropylene (PP), and various-layered materials such as (polypropylene/polyethylene/polypropylene) composite membrane. Porous, flexible substrates (e.g. paper, nitrocellulose, cellulose acetate, cloth, and porous polymer films) such as those described in published US patent application 20110105360, the complete contents of which is hereby incorporated by reference in entirety, may also be employed. The substrate may be composed of layers, such as layers of one or of more than one porous, flexible, deformable, elastic material. Generally, such materials are solids.

The Electrodes

To form the flexible infrared and ultraviolet radiation sensors disclosed herein, at least two metallic electrodes (e.g. a first and second electrode) are also positioned on the porous, flexible substrate. The two metallic electrodes have different standard electrochemical potentials and thus an electric voltage is generated between them. The electrodes are typically flexible, in line with the overall flexibility of the sensors, and may be e.g. made of a metallic foil. The electrodes are generally made or formed from or include at least one a material selected from the group consisting of: aluminum foil, copper foil, gold, silver and platinum, and nickel and zinc may also be used. However, it is noted that, for nickel and zinc, the output voltage will be lower due to lower differences of electrochemical potentials.

The electrodes are attached to the substrate using, for example, a conductive adhesive or paste, many of which are commercially available such as e.g. silver paste; conductive graphite coatings; silicone, epoxy and polyurethane adhesives/pastes containing e.g. silver, gold, aluminum, carbon or the powder of any conducting material, etc.

Schematic Representation

Figure 12:
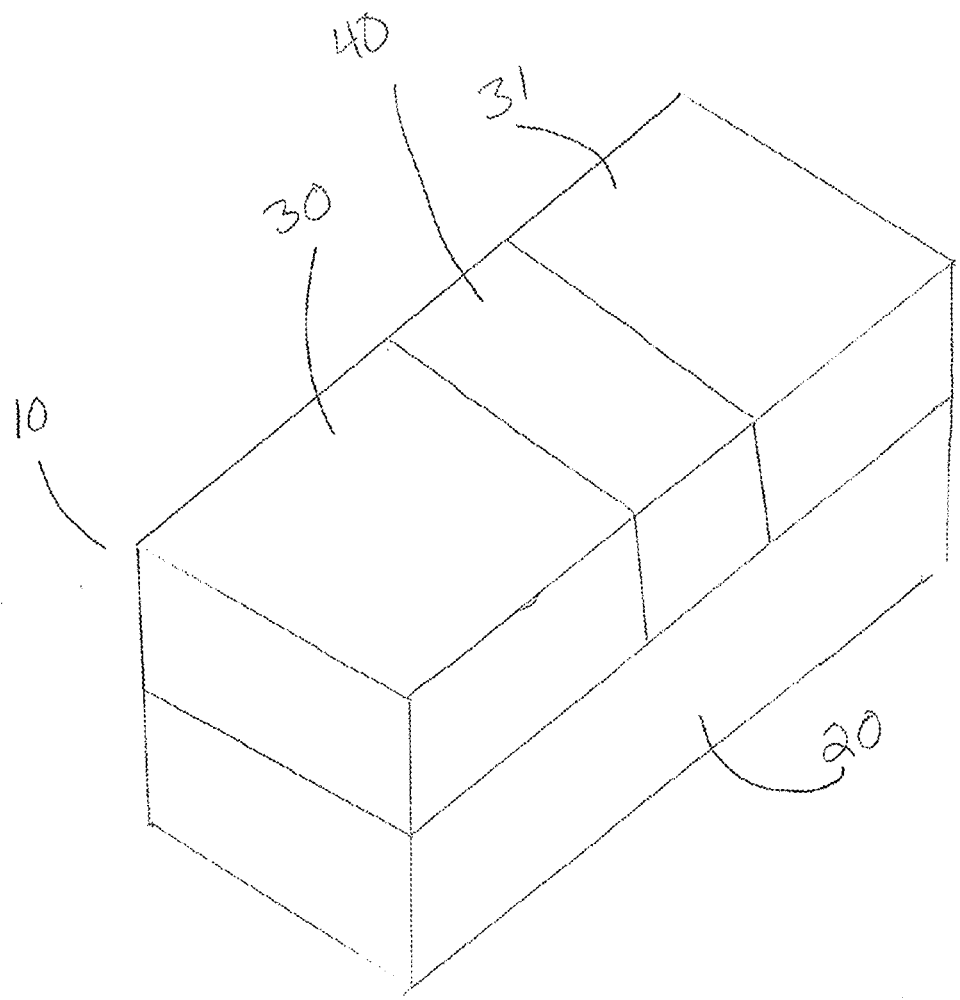
FIG. 12. Schematic representation of an electrochemical cell as disclosed herein.

A schematic representation of the electrochemical cell is shown in FIG. 12. As can be seen, the cell 10 comprises substrate 20 with electrodes 30 and 31 positioned atop substrate 20 and flexible electrolyte 40 positioned atop substrate 20 and between electrodes 30 and 31.

Methods of Use

Also encompassed herein are method of using the electrochemical cells (electrochemical sensors) that are disclosed herein to simultaneously detect UV and IR radiation. The methods generally involve exposing a sensor to a potential or possible source, or even a known source, of at least one of UV and IR irradiation; and detecting (measuring) the change of a parameter, e.g. impedance, open-circuit voltage, resistance, capacitance, etc. that occurs in the sensor as a result of the exposure. For example, when exposed to wavelengths of UV radiation of about 100-200 nm, a decrease of about 0.50 to about 2.00 times, such as about 1.20 to about 1.50. When exposed to wavelengths of IR radiation of about 100-200 Hz, a decrease of about 0.50 to about 2.00 times, such as about 1.20 to about 1.50. On increasing the infrared irradiation from 0 to 4000 W/m$^2$, the open-circuit voltage of the cells increases by about 50 to 70%, such as about 60%. Under the effect of the ultraviolet irradiation from 0 to 200 μW/cm$^2$, the cells' open-circuit voltage was augmented by about 5-15%, such as about 10%. In other words, if at least one of UV and IR radiation is emitted by the source, then the sensor registers a change in one or more of these parameters and the amount or degree of the change is proportional to the amount of radiation.

While the sensors may be used to detect UV and IR simultaneously, the sensors may also be used to detect only one of UV and IR, i.e. a source may be likely to contain only one of UV and IR and the sensors are still used for such applications.

The flexible electrochemical sensors disclosed herein may be employed in any of a wide variety of devices and systems and for a variety of reasons. For example, they are used as flame detectors, monitoring UV disinfection systems, in wearable devices, camera systems. They can be conveniently and accurately used under any terrestrial conditions and/or for applications in space, e.g. in zero gravity, extreme heat or cold, etc. As such, the sensors may be integrated into computerized systems that also include e.g. a power supply, a processor, a memory, a display unit, etc. such as described in e.g. US patent application 20180172506 and issued U.S. Pat. No. 10,955,241, the entire contents of both of which are hereby incorporated by reference in entirety.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

Example 1

The orange dye (OD) having 95% dye content was purchased from Sigma Aldrich. The orange dye ($C_{17}H_{17}N_5O_2$) is an organic semiconductor material having density 0.9 g/cm$^3$ and molecular weight 323.35 g/mol. The OD's IUPAC name is 3[N-Ethyl-4-(4-nitrophenylazo)phenylamino]propionitrile and it has p-type conduction. The molecular structure of orange dye is shown in FIG. 1. Transparent jelly was also purchased from the market. Commercially available rubber was used to make substrates.

To fabricate the sensors, first of all the OD-jelly adhesive composite was prepared by mixing the OD and jelly with the proportion of 40 wt. % and 60 wt. %, respectively. To fabricate the Al/OD-Jelly/Cu shockproof and flexible electrochemical cells, rubber was used as a substrate. The sizes of the rubber substrate were the following: length, width and thickness were 20×10×10 mm$^3$. To form an active layer, the already prepared OD-jelly composite was deposited between aluminium (Al) and copper (Cu) foil electrodes using rubbing-in technology. The Al and Cu foil electrodes were already fixed on the surface of rubber substrates by conducting paste (silver paste or aquadag). The gap between two electrodes was equal to 2-3 mm and the electrodes were in electrical contact with built-in OD-jelly composite layer. The thickness of OD-jelly composite layers was in the range of 17-21 µm. The schematic diagram of the fabricated Al/OD-Jelly/Cu shockproof and flexible electrochemical cell is shown in FIG. 2.

For the measurements of the impedance in the frequency range of 100 Hz to 200 kHz, a digital LCR meter MT 4090 was used, while a DT 4253 digital multimeter was used for the measurements of voltage. The intensities of infrared and ultraviolet irradiations were measured using an LS122 IR power meter and a UV light meter UV-340A. The thickness of the OD-Jelly composite layers was measured using an optical microscope with a built-in micrometer scale.

XRD scans of the OD, transparent jelly and the rubber substrate are shown in FIG. 3. The samples were scanned using a Philips PW1830 XRD in 0-2θ scan mode under Cu-Kα (monochromatic) radiation source with 40 kV accelerating voltage and 25 mA tube current at 25° C. The step size was 0.05° during scanning between 2θ angles 15° and 80°. The XRD scans for each sample (rubber, orange dye and transparent jelly) were repeated and obtained three times. The rubber shows (FIG. 3) high intensity peaks at the angles (2θ) of 18.86°, 23.30°, 29.73°, 30.87°, 36.23° and 39.29°; their corresponding Miller indices are (110), (210), (211), (310), (002) and (121), respectively. All the peaks shown in the rubber's XRD pattern depicts the polyvinyl chloride characteristics that match with PDF #00-064-1628 of the ICDD data base. These peaks correspond to the high structural order of polymeric chains. The orange dye (OD) compound is ammonium oxalate hydrate ($C_2H_8N_2O.H_2O$) and the peaks matched those of the standard XRD database (PDF #00-007-0757) and were consistent with previous studies. No diffraction peak was observed in the x-ray diffractogram of transparent jelly.

Figure 4:
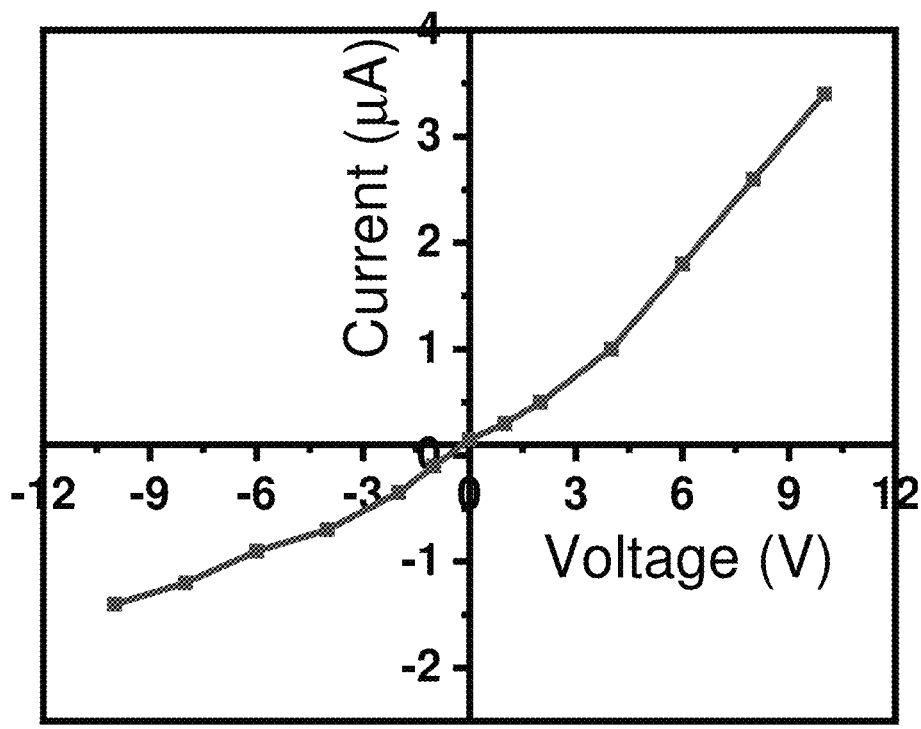
FIG. 4. Volt-ampere characteristics of the rubber-based Al/OD-Jelly/Cu electrochemical cells within a wide range of applied voltages.
Figure 5:
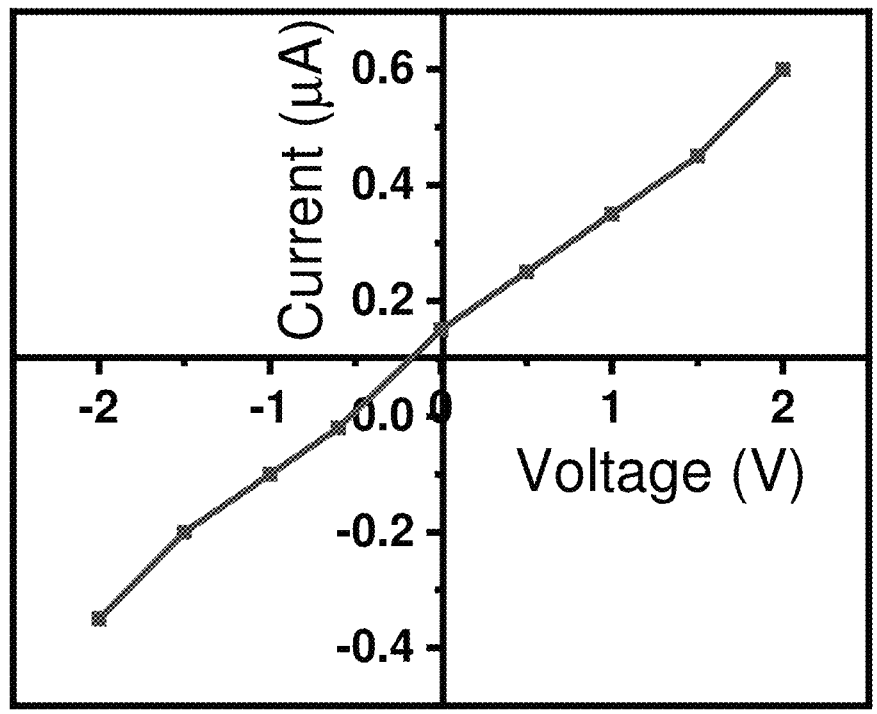
FIG. 5. Volt-ampere characteristics of the rubber-based Al/OD-Jelly/Cu electrochemical cells within a narrow range of applied voltages.

FIG. 4 and FIG. 5 show the volt-ampere characteristics of the Al/OD-Jelly/Cu electrochemical jelly cells in wider and narrow ranges of the applied voltages, respectively. It is seen that I-V characteristics show rectification behavior with the ratio equal to 2.4 and 1.7, respectively. The origin of the rectification behavior is probably due to the difference of the electrochemical potentials of the Al (−1.66 V) and Cu (+0.34) electrodes, which influences the differences of the forward and reverse biases as in semiconductors and metal-semiconductor (Schottky junction) rectifiers.

Figure 6:
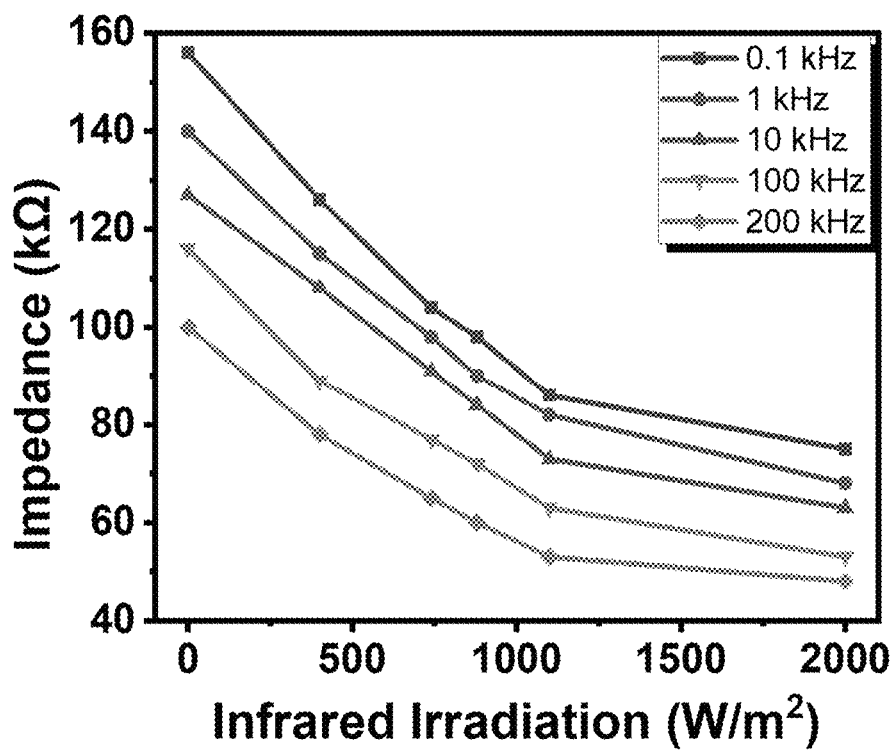
FIG. 6. Dependence of the Al/OD-Jelly)/Cu cells impedance at different frequencies under infrared irradiation.
Figure 7:
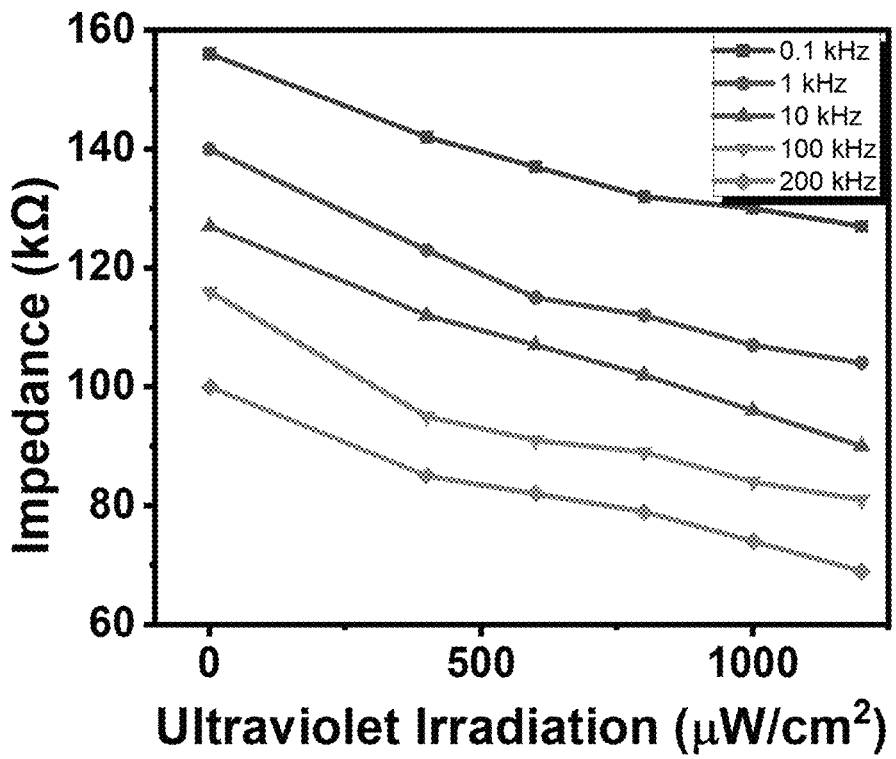
FIG. 7. Dependence of the Al/OD-Jelly)/Cu cells impedance at different frequencies under ultraviolet irradiation.

FIG. 6 shows that the impedance of the cells decreased under exposure to infrared irradiation. This decrease in impedance was in the range of 2.02 to 2.19 times upon changing the frequency from 100 Hz to 200 kHz. The initial impedance of the sensors decreased with increasing frequency. In response to frequency changes from 100 Hz to 200 kHz, the initial impedance decreases from 156 kΩ to 100 kΩ. The impedance-ultraviolet irradiation behavior of the sensors is shown in FIG. 7. It can be seen that the impedance of the cells decreased upon exposure to ultraviolet irradiation. The impedance decreased on average by 1.23 to 1.45 times in response to a frequency change from 100 Hz to 200 kHz.

Figure 8:
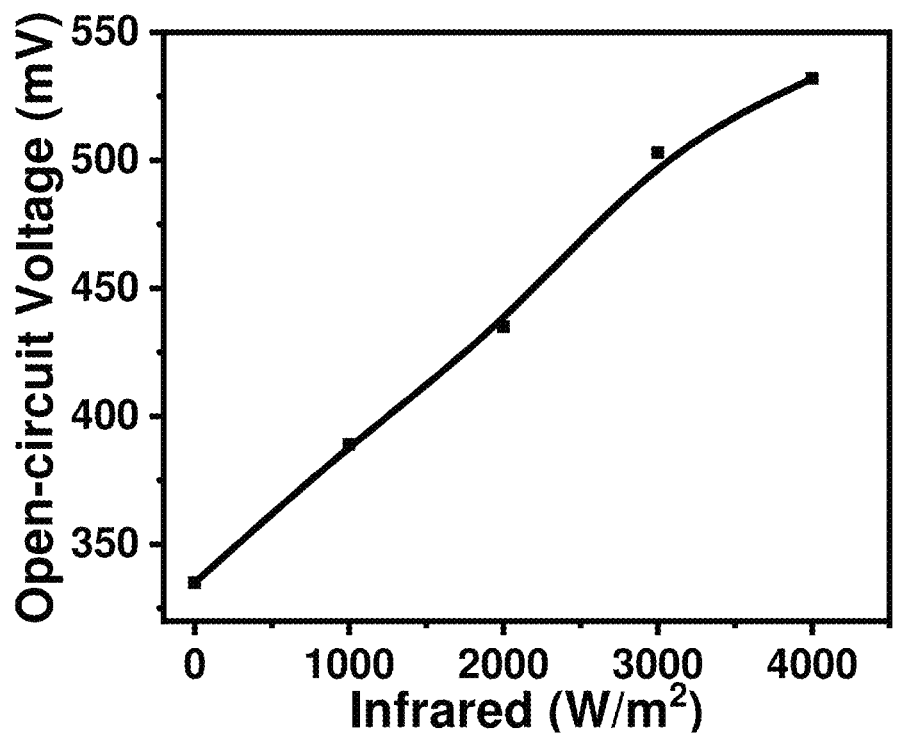
FIG. 8. Open-circuit voltage-infrared irradiation relationship of Al/OD-Jelly)/Cu cells.
Figure 9:
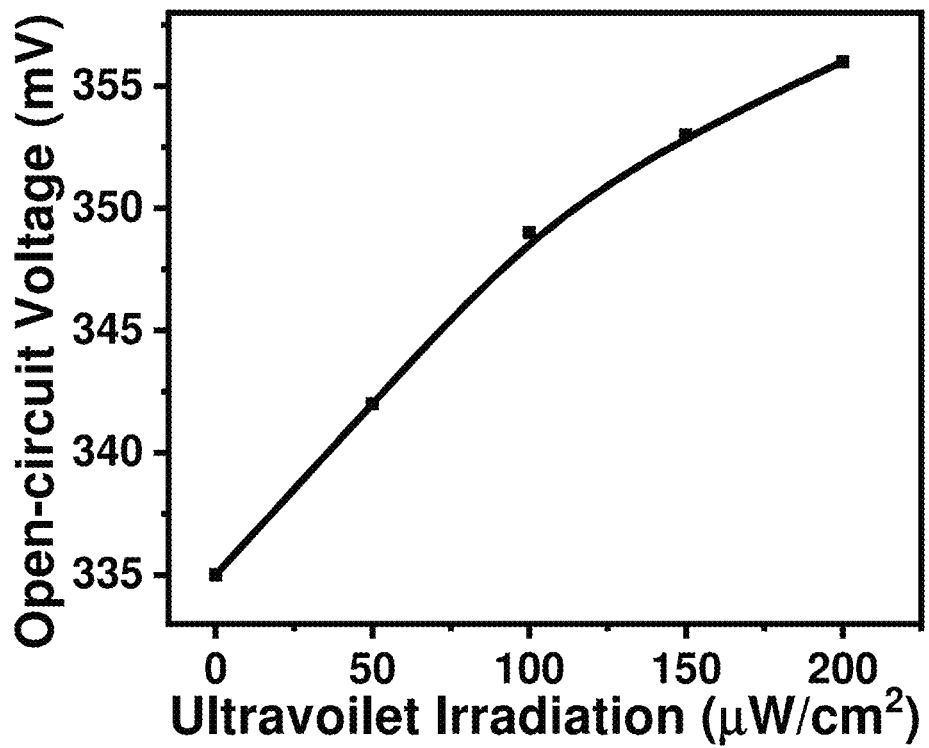
FIG. 9. Open-circuit voltage-ultraviolet irradiation relationship of Al/OD-Jelly)/Cu cells.

The open circuit voltage-infrared irradiation relationship is shown in FIG. 8. On increasing the infrared irradiation from 0 to 4000 W/m$^2$, the open-circuit voltage of the cells increases by 60%. Similarly, the open-circuit voltage-ultraviolet irradiation relationship is shown in FIG. 9. Under the effect of the ultraviolet irradiation from 0 to 200 μW/cm², the cells' open-circuit voltage was augmented by 10%. The origin of these effects can be explained firstly by the changes of the concentration and mobility of the organic semiconductor orange dye-jelly composite. Moreover, without being bound by theory, it is believed that probably the contribution of the contact resistances of Al/OD-Jelly) and Cu/OD-Jelly) metal-semiconductor junctions takes place as well and may be an originally ohmic or rectifying contact by nature.

The experimental results which were presented in FIG. 6 to FIG. 9 can be explained briefly by the thermal effects of the infrared and ultraviolet irradiations on the concentration and mobility of the charges in OD-jelly composite, and to some extent on the electrode potentials between Al/OD-Jelly and Cu/OD-Jelly as well.

Figure 10:
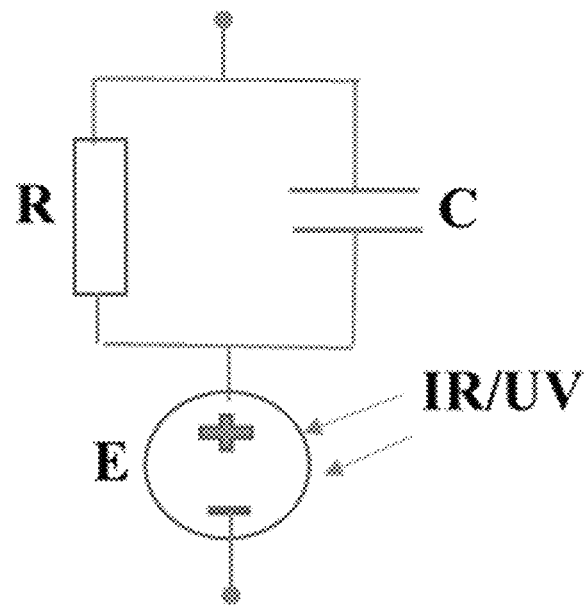
FIG. 10. Simplified equivalent circuit of the Al/OD-Jelly/Cu electrochemical cell which contains parallel connections of the resistance (R) and capacitance (C) with voltage source connected in series.

The equivalent circuit of the Al/OD-Jelly/Cu electrochemical cell is shown in FIG. 10, where the resistance (R) and the capacitance (C) are connected in parallel, while the voltage source (E) is connected in series. As it was shown in FIG. 2, the electrochemical sensors have two metallic electrodes with different standard electrochemical potentials. That is why the generation of the electric voltage takes place.

Figure 11:
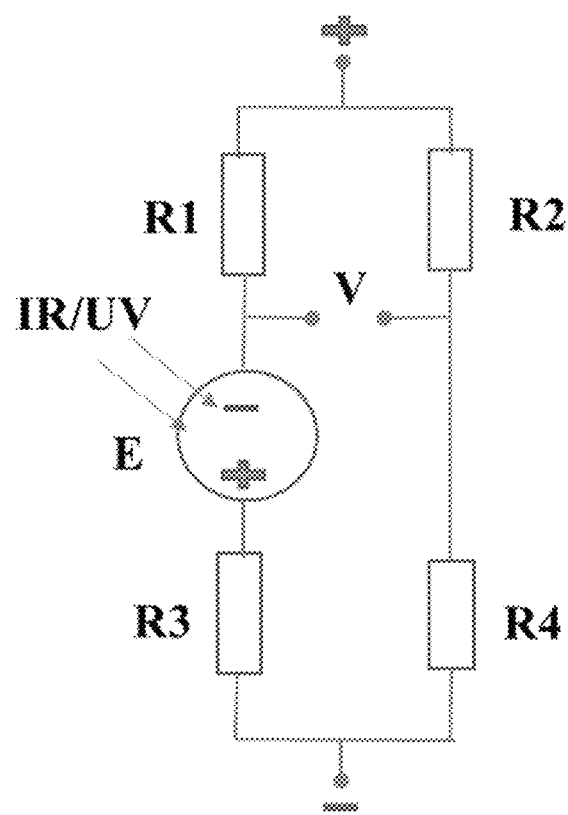
FIG. 11. Wheatstone bridge-based circuit for the measurement of the IR and UV light intensities by the Al/OD-Jelly/Cu electrochemical Cell (E and R3).

In continuation of this work and based on the well-known Wheatstone bridge, the circuit shown in FIG. 11 was designed, fabricated and tested. This circuit allows measurement of the intensity of infrared and ultraviolet irradiations, and the voltage generated by the cell. The proper selection of the polarities of the voltage source to the Wheatstone bridge and terminals of the Al/OD-Jelly/Cu electrochemical cell allowed an increase in the sensitivity of the circuit for the measurement of the intensities of the IR and UV irradiations.

While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

REFERENCES

[1] M. A. Rahman, P Kumar, D.-S. Park, Y.-B Shim, Electrochemical Sensors Based on Organic Conjugated Polymers, Sensors, 8 (2008) 118-141.

[2] M. Kus, Ö. Hakli, C. Zafer, C. Varlikli, S. Demic, S. Özçelik, S. Icli, Optical and electrochemical properties of polyether derivatives of perylenediimides adsorbed on nanocrystalline metal oxide films, Organic Electronics, 9 (2008) 757-766.

[3] Y. Shao, J. Wang, H. Wu, J. Liu, I. A. Aksay, Y. Lin, Graphene Based Electrochemical Sensors and Biosensors: A Review, Electroanalysis, 22 (2010) 1027-1036.

[4] J. Hopkins, K. Fidanovski, A. Lauto, D. Mawad, All-Organic Semiconductors for Electrochemical Biosensors: An Overview of Recent Progress in Material Design, Frontiers in Bioengineering and Biotechnology, 7 (2019).

[5] C. J. Valentine, K. Takagishi, S. Umezu, R. Daly, M. De Voider, Paper-Based Electrochemical Sensors Using Paper as a Scaffold to Create Porous Carbon Nanotube Electrodes, ACS Applied Materials & Interfaces, 12 (2020) 30680-30685.

[6] A. M. White, Infra red detectors, in: U. Patents (Ed.), USA, 1987.

[7] K. C. Liddiard, Semiconductor film bolometer thermal infrared detector, in, US Patent, U.S. Pat. No. 5,369,280, 1994.

[8] M. Mueller, J. Cheng, A. Pisano, T. H. Cauley III, Infrared sensor systems and devices, in, U.S. Pat. No. 7,547,886, 2009.

[9] R. A. McGill, C. Kendziora, R. Furstenberg, M. Papantonakis, J. S. Horwitz, G. K. Hubler, Detection of chemicals with infrared light, in, U.S. Pat. No. 8,101,915, 2012.

[10] P. Sahatiya, S. K. Puttapati, V. V. Srikanth, S. Badhulika, Graphene-based wearable temperature sensor and infrared photodetector on a flexible polyimide substrate, Flexible and Printed Electronics, 1 (2016) 025006.

[11] C. Wang, X. Zhang, W. Hu, Organic photodiodes and phototransistors toward infrared detection: materials, devices, and applications, Chemical Society Reviews, 49 (2020) 653-670.

[12] K. Ranjith, R. R. Kumar, Facile construction of vertically aligned ZnO nanorod/PEDOT: PSS hybrid heterojunction-based ultraviolet light sensors: efficient performance and mechanism, Nanotechnology, 27 (2016) 095304.

[13] G. Memisoglu, C. Varlikli, Highly efficient organic UV photodetectors based on polyfluorene and naphthalenediimide blends: effect of thermal annealing, International Journal of Photoenergy, 2012 (2012).

[14] J. B. Patel, P. Tiwana, N. Seidler, G. E. Morse, O. R. Lozman, M. B. Johnston, L. M. Herz, Effect of Ultraviolet Radiation on Organic Photovoltaic Materials and Devices, ACS applied materials & interfaces, 11 (2019) 21543-21551.

[15] S.-C. C. V. Mantese, Ferroelectric infrared sensors and methods for their manufacturing, in, European Patent, European Patent, 2011.

[16] J. W. Levell, M. E. Giardini, I. D. W. Samuel, A hybrid organic semiconductor/silicon photodiode for efficient ultraviolet photodetection, Opt. Express, 18 (2010) 3219-3225.

[17] I. J. Chung, I. H. Ahn, S. H. Bae, Display with infrared backlight source and multi-touch sensing function, in, U.S. Pat. No. 8,350,827, 2013.

[18] Y. Zou, Y. Zhang, Y. Hu, H. Gu, Ultraviolet Detectors Based on Wide Bandgap Semiconductor Nanowire: A Review, Sensors (Basel), 18 (2018) 2072.

[19] M. C. Mazzillo, A. Sciuto, Semiconductor device for detecting ultraviolet and infrared radiation and related manufacturing process, in, U.S. Pat. No. 9,952,094, 2018.

[20] H. VOGT, Bolometer having an organic semiconductor layer arrangement, in European Patent, 2007.

[21] R. P. Ginn, K. A. Gerber, A. Hampp, A. C. Childs, Infrared photodiodes and sensor arrays with improved passivation layers and methods of manufacture, in, U.S. Pat. No. 7,544,532, 2009.

[22] P. Kropelnicki, M. Russ, H. Vogt, Diode bolometer and method for producing a diode bolometer, in, U.S. Pat. No. 8,569,857, 2013.

We claim:

1. An infrared (IR) and ultraviolet (UV) radiation sensor, comprising
a first electrode and a second electrode positioned on a first section and a second section, respectively, of a top surface of a porous, elastic substrate; and
an electrolyte comprising an orange dye suspended in a gel positioned on the top surface of the porous, elastic substrate and between the first electrode and the second electrode, wherein the gel does not comprise carbon nanotubes.

2. The IR and UV radiation sensor of claim 1, wherein the porous, elastic substrate is selected from the group consisting of: paper, porous polyethylene terephthalate (PET), porous polystyrene-block-poly(ethylene-ran-butylene)-block-polystyrene and rubber.

3. The IR and UV radiation sensor of claim 1, wherein the first electrode and the second electrode are made of aluminum, copper, gold, silver, platinum, nickel or zinc.

4. A method of simultaneously detecting UV and IR irradiation, comprising
exposing the IR and UV radiation sensor of claim 1 to a potential source of UV and/or IR irradiation, and
detecting a voltage change in the flexible IR and UV radiation sensor, wherein the voltage change indicates that the source is emitting one or both of UV and IR irradiation.

5. The IR and UV radiation sensor of claim 1, wherein the orange dye is 3-[N-Ethyl-4-(4-nitrophenylazo)phenylamino]propionitrile.

6. The IR and UV radiation sensor of claim 1, wherein the gel is a flexible, transparent adhesive gel.

7. The IR and UV radiation sensor of claim 1, wherein the gel comprises gelatin, xanthan gum, polyvinyl pyrrolidone (PVP), cross-linked poly (sodium acrylate) or pectin.

8. A method of making an infrared and ultraviolet radiation sensor, comprising
positioning a first electrode and a second electrode on a first section and a second section, respectively, of a top surface of a porous, elastic substrate; and
positioning an electrolyte on the top surface of the porous, elastic substrate and between the first electrode and the second electrode,
wherein the electrolyte comprises an orange dye suspended in a gel, and wherein the gel does not comprise carbon nanotubes.

* * * * *

UNITED STATES PATENT AND TRADEMARK OFFICE
CERTIFICATE OF CORRECTION

PATENT NO. : 11,598,666 B1  
APPLICATION NO. : 17/676561  
DATED : March 7, 2023  
INVENTOR(S) : Muhammad Tariq Saeed Chani et al.

Page 1 of 1

It is certified that error appears in the above-identified patent and that said Letters Patent is hereby corrected as shown below:

In the Specification

Please add the funding acknowledgment to the patent at Column 10, between Lines 56 and 57, just before the claims as follows:
ACKNOWLEDGMENT
The authors extend their appreciation to the Deputyship for Research & Innovation, Ministry of Education in Saudi Arabia for funding this research work through the project number "067-2021" and King Abdulaziz University, DSR, Jeddah, Saudi Arabia.

Signed and Sealed this  
Twenty-eighth Day of November, 2023

Katherine Kelly Vidal  
*Director of the United States Patent and Trademark Office*